(12) United States Patent
Akamatsu et al.

(10) Patent No.: US 11,702,225 B2
(45) Date of Patent: Jul. 18, 2023

(54) CAP SEAL, FASTENING STRUCTURE PROVIDED WITH THE SAME, AND METHOD FOR MOUNTING CAP SEAL

(71) Applicant: MITSUBISHI HEAVY INDUSTRIES, LTD., Tokyo (JP)

(72) Inventors: Hiroki Akamatsu, Tokyo (JP); Koji Irie, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 461 days.

(21) Appl. No.: 17/058,860

(22) PCT Filed: Apr. 12, 2019

(86) PCT No.: PCT/JP2019/015965
§ 371 (c)(1),
(2) Date: Nov. 25, 2020

(87) PCT Pub. No.: WO2020/026533
PCT Pub. Date: Feb. 6, 2020

(65) Prior Publication Data
US 2021/0221532 A1 Jul. 22, 2021

(30) Foreign Application Priority Data

Jul. 31, 2018 (JP) .................................. 2018-143777

(51) Int. Cl.
*F16B 37/14* (2006.01)
*B64D 45/02* (2006.01)
(Continued)

(52) U.S. Cl.
CPC .............. *B64D 45/02* (2013.01); *F16B 37/14* (2013.01); *F16B 33/004* (2013.01); *F16J 15/14* (2013.01)

(58) Field of Classification Search
CPC ...... F16B 33/004; F16B 37/14; F16B 41/005; F16J 15/14; B64D 45/02; Y10S 411/91
(Continued)

(56) References Cited

U.S. PATENT DOCUMENTS

| 5,082,409 A | * | 1/1992 | Bias ...................... F16B 37/14 411/372.5 |
| 9,011,062 B2 | * | 4/2015 | Chirol .................... B64D 45/02 411/372.5 |
| 2013/0223951 A1 | | 8/2013 | Bessho et al. |
| 2014/0234050 A1 | | 8/2014 | Asahara et al. |
| 2014/0321944 A1 | * | 10/2014 | Chirol .................... F16B 37/14 29/515 |

(Continued)

FOREIGN PATENT DOCUMENTS

| JP | 59-43709 | 3/1984 |
| JP | 4-272504 | 9/1992 |

(Continued)

OTHER PUBLICATIONS

International Search Report dated Jun. 25, 2019 in International (PCT) Application No. PCT/JP2019/015965, with English translation.

*Primary Examiner* — Roberta S Delisle
(74) *Attorney, Agent, or Firm* — Wenderoth, Lind & Ponack, L.L.P.

(57) ABSTRACT

Provided are a cap seal with which molding of a seal material by hand can be omitted and variation in cap seal mounting quality can be minimized, a fastening structure provided with said cap seal, and a method for mounting a cap seal. This cap seal comprises: a plurality of cap parts (11) which have an opening (11b) in one end, inside of which a space (11a) is formed, and which have insulation; and a base part (12) which connects the peripheries at the ends of the cap parts (11) on the opening (11b)-sides together and
(Continued)

which has insulation; the cap parts (11) accommodating seal members and protruding parts of fastening members inside the spaces (11*a*), and the opening (11*b*)-side surface of the base part (12) being fabricated into a mounting surface (16).

8 Claims, 4 Drawing Sheets

(51) Int. Cl.
*F16B 33/00* (2006.01)
*F16J 15/14* (2006.01)

(58) Field of Classification Search
USPC .................. 411/337, 372.5, 372.6, 373, 377
See application file for complete search history.

(56) References Cited

U.S. PATENT DOCUMENTS

| | | | |
|---|---|---|---|
| 2016/0068274 A1 | 3/2016 | Zook et al. | |
| 2017/0298979 A1* | 10/2017 | Aston | B64D 45/02 |
| 2020/0032834 A1* | 1/2020 | Auffinger | F16B 35/06 |
| 2020/0080585 A1* | 3/2020 | Roper | F16B 33/004 |
| 2020/0149579 A1* | 5/2020 | Hansen | B64D 45/02 |
| 2022/0153430 A1* | 5/2022 | Cowan | B64D 45/02 |

FOREIGN PATENT DOCUMENTS

| | | |
|---|---|---|
| JP | 7-301222 | 11/1995 |
| JP | 2013-95371 | 5/2013 |
| JP | 2016-114182 | 6/2016 |
| JP | 2016-518271 | 6/2016 |
| WO | 2012/147645 | 11/2012 |
| WO | 2014/172302 | 10/2014 |

\* cited by examiner

US 11,702,225 B2

CAP SEAL, FASTENING STRUCTURE PROVIDED WITH THE SAME, AND METHOD FOR MOUNTING CAP SEAL

TECHNICAL FIELD

The present disclosure relates to a cap seal, a fastening structure provided with the cap seal, and a method for mounting the cap seal.

BACKGROUND ART

A wing forming a body of an aircraft has a hollow structure, and a wing surface panel forming the surface of the wing is fastened to a structural member, which is provided in the wing, by fastener members (fastening members).

A cylindrical fastener body of each fastener member is inserted into through-holes, which are formed in both the wing surface panel and the structural member provided in the wing, from the outside of the wing, the tip portion of the fastener member protrudes from the wall surface of the structural member provided in the wing, and the protruding fastener member is fixed from the inside, so that the fastener members fasten the wing surface panel to the structural member.

In an aircraft, it is necessary to take all possible measures against a thunderbolt. In a case where the wing surface panel and the fastener members are made of different materials, there is a concern that arc discharge (spark) may be generated in a direction along an interface between the wing surface panel and the fastener member due to a potential difference between the wing surface panel and the fastener member at the time of a thunderbolt. Since a fuel tank is housed in the interior space of the wing, it is necessary to reliably prevent spark from being generated during a thunderbolt.

In contrast, PTL 1 discloses a structure where a space formed between a cap, which is made of an insulating material and is mounted so as to cover a protruding fastener member, and a shaft portion is filled with an insulating sealant.

CITATION LIST

Patent Literature

[PTL 1] Japanese Unexamined Patent Application Publication No. 2013-95371

SUMMARY OF INVENTION

Technical Problem

However, since the cap is independent in PTL 1, a sealant extruded from the respective caps, particularly, a sealant extruded from gaps between a plurality of caps installed adjacent to each other should be manually shaped to ensure mountability in a case where, for example, a plurality of fastener members are installed adjacent to each other.

Since such manual shaping requires time and effort and the finishing of the manual shaping depends on the skill of a worker, there is a concern that a variation may occur in the quality of mounting. For example, air may be mixed to an extruded sealant in a step of manual shaping.

The disclosure has been made in consideration of such circumstances, and an object of the disclosure is to provide a cap seal that allows the manual shaping of a sealing material to be omitted and can suppress a variation in the quality of the mounting of thereof, a fastening structure provided with the cap seal, and a method for mounting the cap seal.

Solution to Problem

In order to achieve the object, a cap seal of the disclosure, a fastening structure provided with the cap seal, and a method for mounting the cap seal employ the following means.

That is, a cap seal according to an aspect of the disclosure includes: a plurality of cap portions each of which includes an opening at one end thereof, includes a space formed therein, and has insulating properties; and a base portion that connects peripheries of end portions of the respective cap portions on sides of the openings and has insulating properties. A protruding portion of a fastening member and a sealing material are housed in the space of each cap portion, and a surface of the base portion on sides of the openings is a mounting surface.

According to the cap seal of this aspect, the plurality of cap portions are connected to each other by the base portion and the respective cap portions are integrated, so that the cap seal is formed. For this reason, when the cap seal is mounted on a surface (a mounting target surface) from which end portions of the fastening members protrude so that the spaces of the respective cap portions are filled with the sealing material and the protruding portions of the fastening members are housed in the spaces, the manual shaping of the sealing material extruded from gaps between the respective cap portions can be omitted as compared to a case where a plurality of cap portions are individually mounted.

Further, the skill of a worker is required for the above-mentioned manual shaping, but a variation in the quality of the mounting of the cap seal can be suppressed since the manual shaping is omitted.

The cap portions, the base portion, and the sealing material have insulating properties, and, for example, a polysulfide resin material is employed for the cap portions, the base portion, and the sealing material.

In the cap seal according to the aspect of the disclosure, slits penetrating the base portion up to a side opposite to the mounting surface from the mounting surface are formed in the base portion.

According to the cap seal of this aspect, since the slits are formed in the base portion, it is possible to easily and visually check that the sealing material is extruded from the space formed in each cap portion. That is, since gaps between the cap portions and the fastening members are filled with the sealing material in a case where it is possible to check that the sealing material is extruded from the slits, the mounting of the cap seal is ensured.

In the cap seal according to the aspect of the disclosure, groove portions, each of which is formed between the adjacent slits and is open toward the mounting surface, are formed in the base portion.

According to the cap seal of this aspect, since the groove portions formed in the base portion are also filled with the sealing material during the mounting of the cap seal, not only the cap portions but also the base portion itself can be mounted on the mounting target surface. Accordingly, the strong mounting of the cap seal as a whole can be achieved.

In the cap seal according to the aspect of the disclosure, the base portion includes partition wall portions that are provided between the slits and the groove portions and partition the slits and the groove portions.

According to the cap seal of this aspect, since the partition wall portions are present, it is possible to prevent the sealing material, with which the groove portions are filled, from flowing to the slits. If the sealing material with which the groove portions are filled flows to the slits, the mountability between the base portion and the mounting target surface caused by the sealing material with which the groove portions are filled deteriorates.

In the cap seal according to the aspect of the disclosure, the base portion has a substantially polygonal shape in plan view.

According to the cap seal of this aspect, the base portion has a substantially polygonal shape in plan view. Accordingly, even though the sealing material is extruded from the periphery of the base portion, that is, the periphery of the cap seal when the cap seal is mounted on the mounting target surface using the sealing material, the sealing material has only to be manually shaped along the straight sides of a substantially polygonal shape. Therefore, the sealing material extruded from the periphery of the cap seal can be easily shaped manually. Examples of the shape of the base portion include the shape of a parallelogram, and the like.

In the cap seal according to the aspect of the disclosure, the mounting surface is a surface that is to be mounted on a structural member of an aircraft.

According to the cap seal of this aspect, for example, in a case where a fuel tank is installed in the interior space of a wing as a structural member of an aircraft and the cap seal is mounted in the interior space, fastening members protruding from the surface of the wing facing the interior space are covered with the cap seal. Accordingly, even though large current caused by a thunderbolt or the like flows in the fastening members, it is possible to prevent spark from being generated on a side where fuel tank is present (a side where the fastening members protrude).

A fastening structure according to another aspect of the disclosure includes a plurality of fastening members that fasten a structural member of an aircraft, the above-mentioned cap seal that is mounted on the structural member so as to cover portions of the respective fastening members protruding from the structural member, and a sealing material with which the cap seal is filled.

According to the fastening structure of this aspect, for example, for example, in a case where a fuel tank is installed in the interior space of a wing as a structural member of an aircraft, fastening members protruding from the surface of the wing facing the interior space are covered with the cap seal. Accordingly, even though large current caused by a thunderbolt or the like flows in the fastening members, it is possible to prevent spark from being generated on a side where fuel tank is present (a side where the fastening members protrude).

A cap seal includes a plurality of cap portions each of which includes an opening at one end thereof, includes a space formed therein, and has insulating properties, and a base portion that connects peripheries of end portions of the respective cap portions on sides of the openings and has insulating properties, and a surface of the base portion on sides of the openings is a mounting surface. A method for mounting the cap seal according to still another aspect of the disclosure includes a cap portion filling step of filling the spaces of the cap portions with a sealing material, and a mounting step of causing the mounting surface to face a mounting target surface of a structural member of an aircraft and mounting the cap seal so that protruding portions of a plurality of fastening members are housed in the spaces of the respective cap portions.

According to the method for mounting a cap seal of this aspect, it is possible to provide a method for mounting a cap seal that allows the manual shaping of a sealing material, which is extruded from gaps between the respective cap portions, to be omitted.

The cap portions, the base portion, and the sealing material have insulating properties, and, for example, a polysulfide resin material is employed for the cap portions, the base portion, and the sealing material.

Advantageous Effects of Invention

According to a cap seal of the disclosure, a fastening structure provided with the cap seal, and a method for mounting the cap seal, since the manual shaping of a sealing material can be omitted, a variation in the quality of the mounting of the cap seal can be suppressed.

DESCRIPTION OF EMBODIMENTS

A cap seal according to an embodiment of the disclosure will be described below with reference to FIGS. 1 to 5.

First, the summary of a cap seal 10 will be described.

Figure 1:
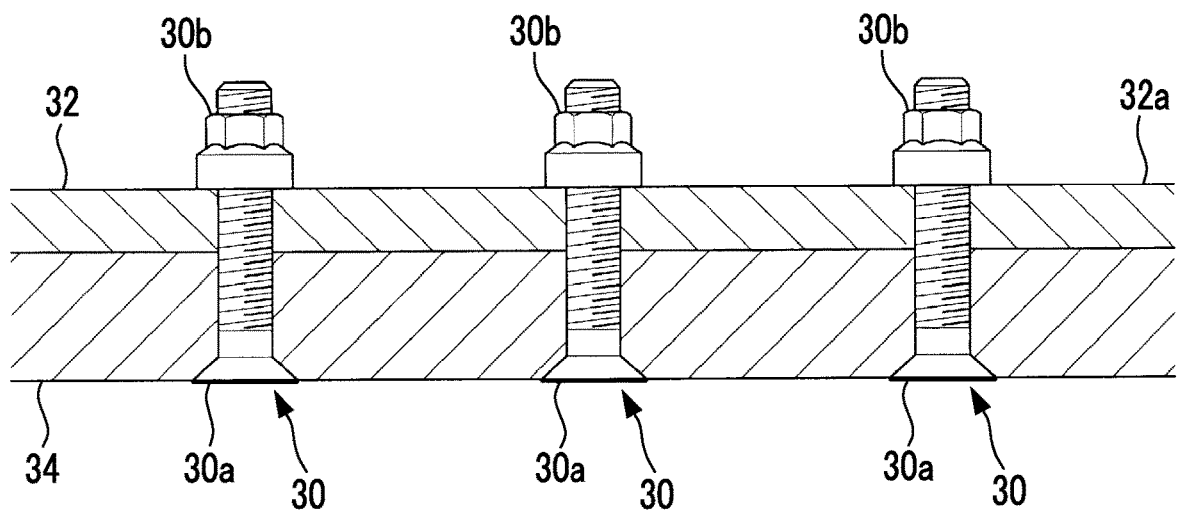
FIG. 1 is a longitudinal sectional view of a structure on which a cap seal according to an embodiment of the disclosure is to be mounted.

A structural member 32 on which the cap seal 10 is to be mounted is shown in FIG. 1. The structural member 32 is, for example, a structural member (for example, a longeron or the like) that is provided in the wing of an aircraft. For example, a wing surface panel 34 forming the surface of the wing is mounted on one surface (the lower surface in the drawing) of the structural member 32 by fastener members (fastening members) 30.

Each fastener member 30 includes a cylindrical fastener body 30a and a collar 30b. The fastener body 30a is inserted into coaxial through-holes, which are formed in both the structural member 32 and the wing surface panel 34, from a side where the wing surface panel 34 is present. Further, the collar 30b is mounted on a portion, which penetrates the wing surface panel 34 and the structural member 32 and protrudes from the structural member 32, of the fastener body 30a inserted into the through-holes, by a screw structure. That is, a portion of the fastener body 30a protruding from the structural member 32 and the collar 30b mounted thereon protrudes from the surface (the upper surface in the drawing) of the structural member 32 opposite to the surface of the structural member 32 on which the wing surface panel 34 is mounted. The portion of the fastener body 30a protruding from the structural member 32 and the collar 30b will be referred to as a "protruding portion" below. The structural member 32 and the wing surface panel 34 are fastened to each other by these fastener members 30.

Figure 2:
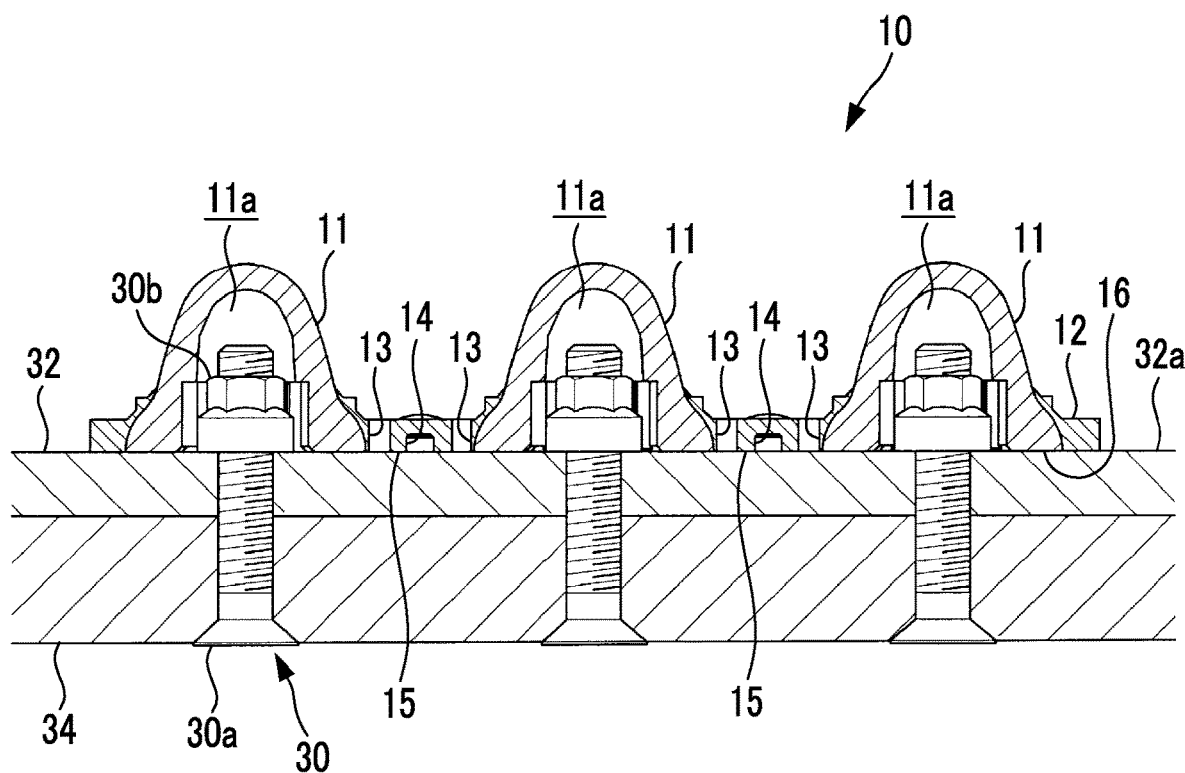
FIG. 2 is a longitudinal sectional view of the structure on which the cap seal according to the embodiment of the disclosure is mounted.

As shown in FIG. 2, the cap seal 10 is mounted on the surface of the structural member 32 which is opposite to one surface of the above-mentioned structural member 32 (the surface on which the wing surface panel 34 is positioned) and from which the fastener member 30 protrudes. This surface on which the cap seal 10 is mounted will be referred to as a "mounting target surface 32a" below.

Next, the configuration of the cap seal 10 will be described.

Figure 3:
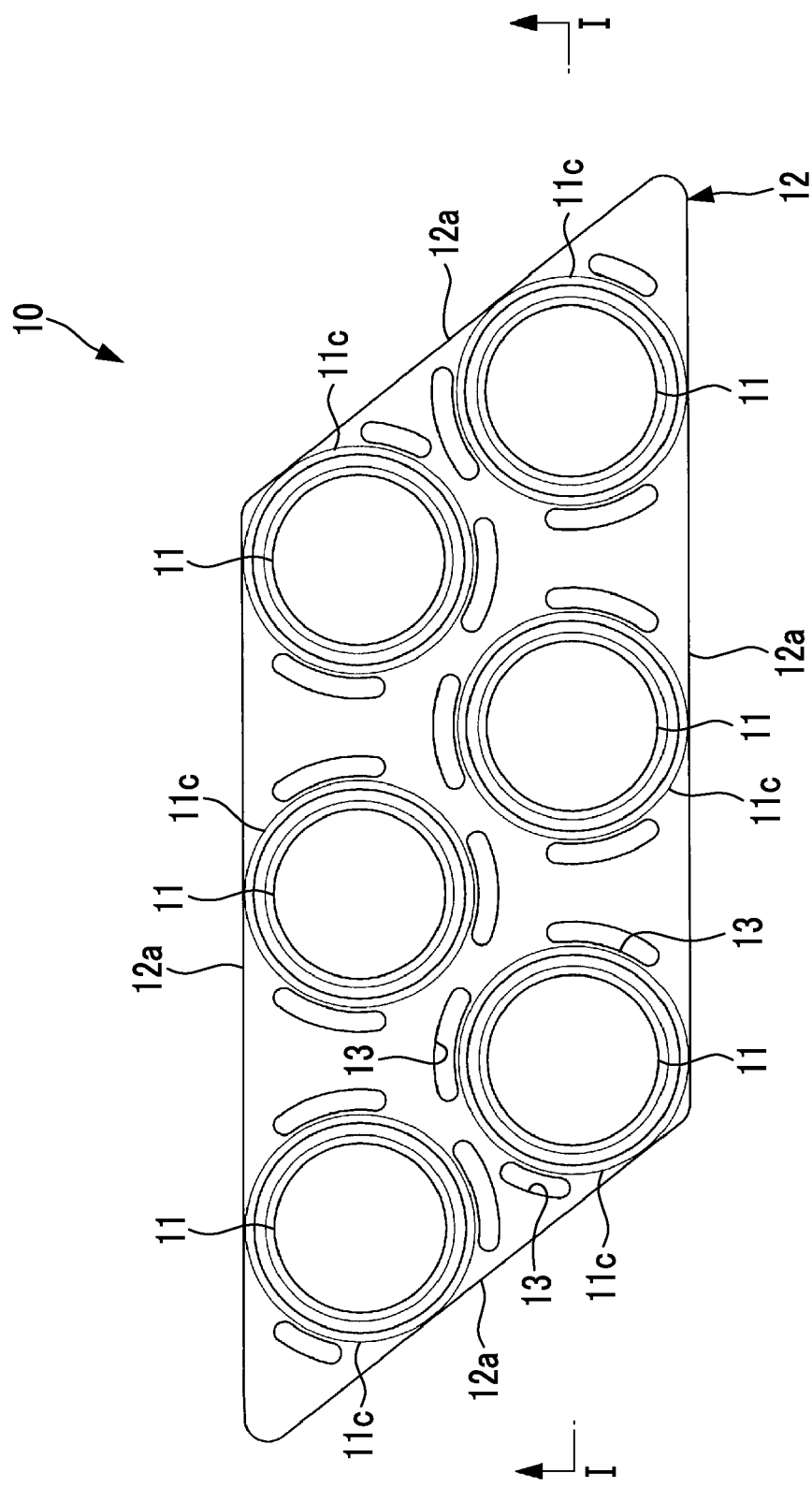
FIG. 3 is a plan view of the cap seal according to the embodiment of the disclosure.
Figure 4:
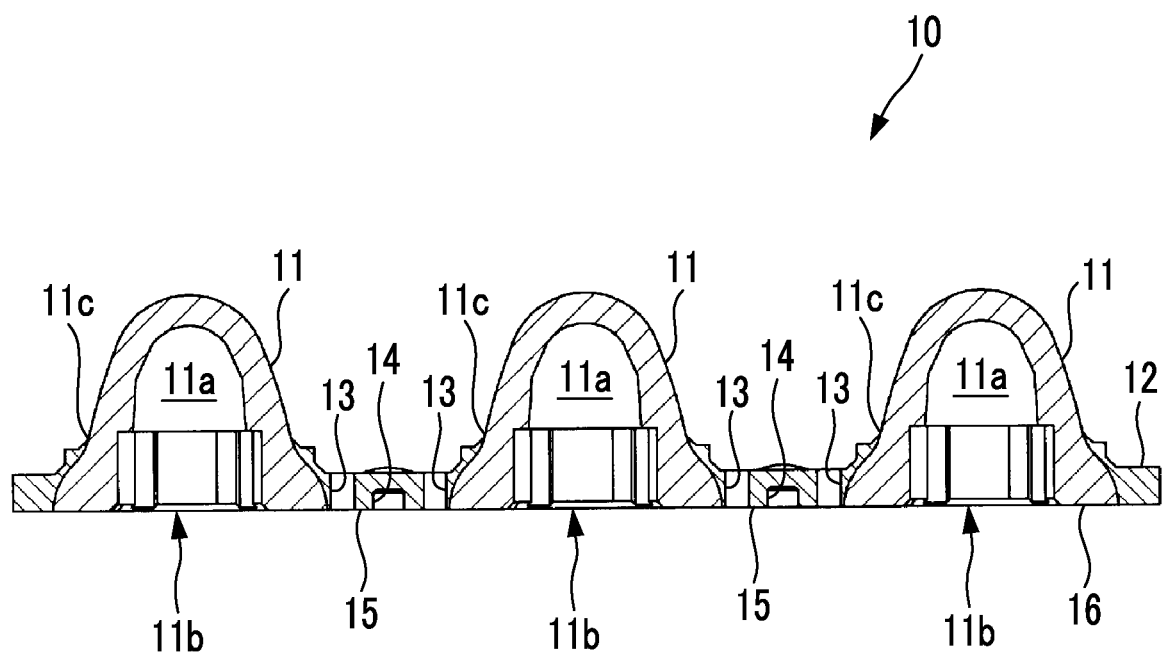
FIG. 4 is a longitudinal sectional view taken along line I-I of FIG. 3.

As shown in FIGS. 3 and 4, the cap seal 10 includes a plurality of cap portions 11 and a base portion 12 connecting the respective cap portions 11.

The cap portion 11 has a circular shape in plan view as shown in FIG. 3. Further, the cap portion 11 has the shape of a cap which includes an opening 11b at one end thereof and of which the other end is closed as shown in FIG. 4. A space 11a, which communicates with the opening 11b and extends in the height direction of the cap seal 10 (a vertical direction shown in FIG. 4), is formed in the cap portion 11. As shown in FIG. 2, the protruding portion of the above-mentioned fastener member 30 is housed in the space 11a. The cap portion 11 has insulating properties and, for example, a polysulfide resin material is employed for the cap portion 11.

In the case of FIG. 3, the cap seal 10 includes six cap portions 11. Further, the six cap portions 11 are arranged substantially in the form of a parallelogram so that three cap portions 11 are arranged in a left-right direction on each of upper and lower stages, that is, two stages shown in the drawing.

The base portion 12 is formed in the shape of a parallelogram so as to surround the six cap portions 11, which are arranged substantially in the form of a parallelogram, by a peripheral edge thereof in a case where the base portion 12 is viewed in plan view as shown in FIG. 3. In this case, each side of the parallelogram includes a straight portion 12a. In other words, the base portion 12 is formed in the shape of a parallelogram including four straight portions 12a. Further, as shown in FIGS. 3 and 4, the base portion 12 is formed so as to connect peripheral edge portions 11c of the respective cap portions 11 on sides of the openings 11b. Accordingly, the respective cap portions 11 and the base portion 12 are integrated with each other before the cap seal 10 is mounted on the mounting target surface 32a. The base portion 12 has insulating properties and, for example, a polysulfide resin material is employed for the base portion 12. The thickness of the base portion 12 is in the range of about ⅐ to ⅕ of the thickness of the cap seal 10 in the height direction, and is set in the range of about 2 mm to 5 mm.

As shown in FIG. 4, with regard to the respective cap portions 11 and the base portion 12 connecting these cap portions 11, a surface on which the openings 11b are formed is a mounting surface 16 and the mounting surface 16 is a surface facing the above-mentioned mounting target surface 32a. Further, the mounting surface 16 is in surface contact with the mounting target surface 32a, so that the cap seal 10 is mounted as shown in FIG. 2.

For example, the cap seal 10 shown in FIG. 3 includes the six cap portions 11 and the base portion 12 having the shape of a parallelogram, but is not particularly limited to this configuration. The number and arrangement of the cap portions 11 may be appropriately changed depending on the number and arrangement of the protruding fastener members 30. Further, the base portion 12 is not limited to the shape of a parallelogram, and may have other polygonal shapes having substantially straight portions 12a. Furthermore, the base portion 12 may have a circular shape or an oval shape, and may have a combined shape of a polygonal shape and a circular shape (oval shape).

Figure 5:
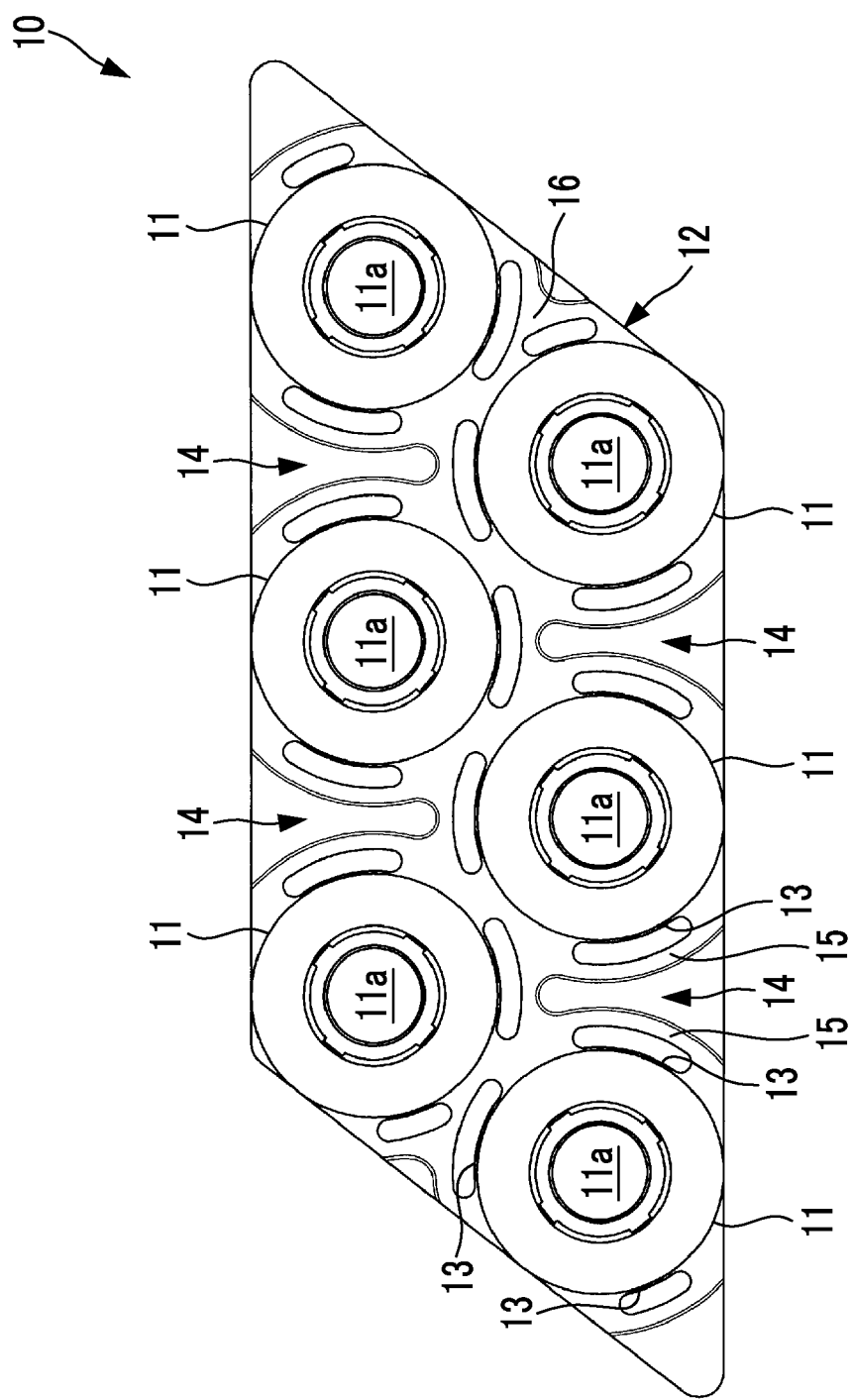
FIG. 5 is a bottom view of the cap seal according to the embodiment of the disclosure.

As shown in FIGS. 3 to 5, slits 13, groove portions 14, and partition wall portions 15 are formed in the base portion 12 of the cap seal 10.

As shown in FIG. 3, the slits 13 are formed at a plurality of positions along the outer peripheries of the peripheral edge portions 11c of the cap portions 11. The slit 13 has a substantially arc shape having the same center as the center of the cap portion 11 having a circular shape in plan view. A plurality of (three in this embodiment) slits 13 are provided around one cap portion 11 so as to be spaced apart from each other. Further, as shown in FIG. 4, each slit 13 is formed with a predetermined width so as to penetrate the base portion up to the surface (upper surface) of the base portion opposite to the mounting surface 16 from the mounting surface 16.

Each groove portion 14 is formed between the adjacent slits 13 as shown in FIG. 5. Further, each groove portion 14 is a groove having an opening on the mounting surface 16 as shown in FIG. 4, and the depth of the groove portion 14 is about ½ of the thickness of the base portion 12 and is set in the range of 1 mm to 3 mm. The groove portions 14 do not penetrate the base portion 12 unlike the slits 13.

Each partition wall portion 15 is a wall formed between the slit 13 and the groove portion 14 adjacent to the slit 13. As shown in FIG. 2, the partition wall portions 15 are formed so that end portions of the partition wall portions 15 on the mounting surface 16 are in contact with the mounting target surface 32a in a case where the cap seal 10 is mounted on the mounting target surface 32a.

The above-mentioned cap seal 10 is produced as follows.

The cap portions 11 formed in advance are arranged in a mold machined in the shape of the base portion 12 so that the slits 13, the groove portions 14, and the partition wall portions 15 are formed. The mold in which the cap portions 11 are arranged is filled with the material of the base portion 12, so that the cap seal 10 is produced.

A method for mounting the cap seal 10 will be described below.

In the cap seal 10 shown in FIG. 4, first, the spaces 11a of the cap portions 11 and the groove portions 14 formed in the base portion 12 are filled with a sealing material. It does not matter whether the sealing material is extruded from the spaces 11a or the groove portions 14. The sealing material has insulating properties and, for example, a polysulfide resin material is employed as the sealing material.

After that, the orientation of the cap seal 10 is set so that the mounting surface 16 of the cap seal 10 faces the mounting target surface 32a of the structural member 32. Then, the cap seal 10 is mounted on the mounting target surface 32a so that the fastener members 30 (protruding portions) protruding from the mounting target surface 32a are housed in the spaces 11a formed in the cap portions 11.

Since the protruding portion of each fastener member 30 is housed in the space 11a, a part of the sealing material with which each space 11a is filled (that is, the sealing material having substantially the same volume as the protruding portion of the housed fastener member 30) is extruded from the opening 11b. The extruded sealing material flows to the slits 13, which are formed around the cap portion 11, through a gap between the mounting surface 16 and the mounting target surface 32a. Since the slits 13 penetrate the base portion up to the surface (upper surface) of the base portion opposite to the mounting surface 16 from the mounting surface 16, the sealing material extruded from each space 11a is further extruded from the upper surface side of the slits 13. That is, since a gap between each cap portion 11 and each fastener member 30 is filled with the sealing material in a case where it is possible to visually check that the sealing material is extruded from the upper surface side of the slits 13, the mounting of the cap seal 10 is ensured. The cap seal 10 is mounted on the mounting target surface 32a and the protruding portions of the fastener members 30 by the sealing material with which the spaces 11a are filled.

The sealing material with which the groove portions 14 are filled fills the groove portions 14 in a case where the mounting surface 16 is in close contact with the mounting target surface 32a. At this time, since the partition wall portions 15 are formed between each groove portion 14 and the slits 13, the sealing material filling the groove portions 14 does not flow out to the slits 13. The base portion 12 of the cap seal 10 is also mounted on the mounting target surface 32a by the sealing material with which the groove portions 14 are filled.

A part of the sealing material, with which the spaces 11a of the cap portions 11 and the groove portions 14 formed in the base portion 12 are filled, is extruded from the peripheral edge of the base portion 12 having the shape of a parallelogram (that is, the peripheral edge of the cap seal 10) in a case where the cap seal 10 is mounted. The extruded sealing material is manually shaped along the straight portions 12a. Accordingly, the sealing material extruded from the peripheral edge of the base portion 12 is molded. The cap seal 10 is mounted on the mounting target surface 32a through the above-mentioned steps.

According to this embodiment, the following effects can be achieved.

The plurality of cap portions 11 are connected to each other by the base portion 12 and the respective cap portions 11 are integrated, so that the cap seal 10 is formed. For this reason, the manual shaping of a sealing material extruded from gaps between the respective cap portions can be omitted as compared to a case where a plurality of independent cap portions are individually mounted on the mounting target surface 32a. Further, the skill of a worker is required for the above-mentioned manual shaping, but a variation in the quality of the mounting of the cap seal 10 can be suppressed since extra manual shaping is omitted.

Furthermore, since the slits 13 are formed in the base portion 12, it is possible to easily and visually check that the sealing material is extruded from the space 11a formed in each cap portion 11. That is, since gaps between the cap portions 11 and the protruding portions of the fastener members 30 are filled with the sealing material in a case where it is possible to check that the sealing material is extruded from the slits 13, the mounting of the cap seal 10 is ensured.

Moreover, since the groove portions 14 formed in the base portion 12 are also filled with the sealing material during the mounting of the cap seal 10, not only the cap portions 11 but also the base portion 12 itself can be mounted on the mounting target surface 32a. Accordingly, the strong mounting of the cap seal 10 as a whole can be achieved. Since the partition wall portions 15 are present, it is possible to prevent the sealing material, with which the groove portions 14 are filled, from flowing to the slits 13.

Further, in a case where the base portion 12 has a substantially polygonal shape in plan view, the sealing material has only to be manually shaped along the straight portions 12a of a substantially polygonal shape even though the sealing material is extruded from the periphery of the base portion 12, that is, the periphery of the cap seal 10 when the cap seal 10 is mounted on the mounting target surface 32a using the sealing material. Accordingly, the sealing material extruded from the periphery of the base portion 12 can be easily shaped manually.

The dimensions and ratios of the base portion 12 and the groove portions 14 described above are exemplary, and it goes without saying that the dimensions and ratios of the base portion 12 and the groove portions 14 described above can be appropriately changed according to the specifications of the cap seal 10.

REFERENCE SIGNS LIST

10: cap seal
11: cap portion
11a: space
11b: opening
11c: peripheral edge portion
12: base portion
12a: straight portion
13: slit
14: groove portion
15: partition wall portion
16: mounting surface
30: fastener member
30a: fastener body
30b: collar
32: structural member
32a: mounting target surface
34: wing surface panel

The invention claimed is:

1. A cap seal comprising:
a plurality of cap portions each of which includes an opening at one end thereof, includes a space formed therein, and has insulating properties; and
a base portion that connects peripheries of end portions of the respective cap portions on sides of the openings and has insulating properties,
wherein a protruding portion of a fastening member and a sealing material are housed in the space of each cap portion, and
a surface of the base portion on sides of the openings is a mounting surface.

2. The cap seal according to claim 1,
wherein slits penetrating the base portion up to a side opposite to the mounting surface from the mounting surface are formed in the base portion.

3. The cap seal according to claim 2,
wherein groove portions, each of which is formed between the adjacent slits and is open toward the mounting surface, are formed in the base portion.

4. The cap seal according to claim 3,
wherein the base portion includes partition wall portions that are provided between the slits and the groove portions and partition the slits and the groove portions.

5. The cap seal according to claim 1,
wherein the base portion has a substantially polygonal shape in plan view.

6. The cap seal according to claim 1,
wherein the mounting surface is a surface that is to be mounted on a structural member of an aircraft.

7. A fastening structure for a structural member of an aircraft comprising:
a plurality of fastening members that fasten a structural member of an aircraft;

the cap seal according to claim 1 that is mounted on the structural member so as to cover portions of the respective fastening members protruding from the structural member; and a sealing material with which the cap seal is filled.

8. A method for mounting a cap seal, the cap seal including a plurality of cap portions each of which includes an opening at one end thereof, includes a space formed therein, and has insulating properties, and a base portion that connects peripheries of end portions of the respective cap portions on sides of the openings and has insulating properties, and a surface of the base portion on sides of the openings being a mounting surface, the method comprising:

a cap portion filling step of filling the spaces of the cap portions with a sealing material; and a mounting step of causing the mounting surface to face a mounting target surface of a structural member of an aircraft and mounting the cap seal so that protruding portions of a plurality of fastening members are housed in the spaces of the respective cap portions.

\* \* \* \* \*